United States Patent [19]
Boucherie

[11] Patent Number: 6,051,176
[45] Date of Patent: Apr. 18, 2000

[54] METHOD FOR MANUFACTURING BRUSH BODIES FOR TOOTH BRUSHES

[76] Inventor: Bart Gerard Boucherie, Ambachtenstraat 84., 8870 Izegem, Belgium

[21] Appl. No.: 08/954,898

[22] Filed: Oct. 21, 1997

[30] Foreign Application Priority Data

Oct. 21, 1996 [BE] Belgium ................ 09600889

[51] Int. Cl.$^7$ ................ B28B 7/10; B28B 7/16
[52] U.S. Cl. ............ 264/250; 264/243; 264/264; 264/328.8; 425/805; 425/112; 425/126.1; 425/444
[58] Field of Search ................ 264/250, 243, 264/328.8, 264; 425/805, 112, 126.1, 444

[56] References Cited

U.S. PATENT DOCUMENTS

| | | | |
|---|---|---|---|
| 5,087,403 | 2/1992 | Weihrauch | 264/157 |
| 5,256,048 | 10/1993 | Jacobs et al. | 425/130 |
| 5,352,025 | 10/1994 | Huang | 300/21 |
| 5,609,890 | 3/1997 | Boucherie | 425/120 |

FOREIGN PATENT DOCUMENTS

| | | |
|---|---|---|
| 0 504 571 | 9/1992 | European Pat. Off. . |
| 41 27 621 | 2/1993 | Germany . |
| 44 00 649 | 7/1995 | Germany . |
| 44 17 986 | 11/1995 | Germany . |

*Primary Examiner*—Jill L. Heitbrink
*Assistant Examiner*—Suzanne E. Mason
*Attorney, Agent, or Firm*—Bacon & Thomas PLLC

[57] ABSTRACT

Method for manufacturing brush bodies for tooth brushes, in particular for injection moulding brush bodies (2) consisting of at least two components (5–9), of the type whereby at least one first injection moulding piece (25) is formed of a first component (5) in a first mould (3), consisting of at least two mould parts (4–6); whereby at least one second injection moulding piece (26) is formed by providing the first injection moulding piece (25) in a second mould (7), which also consists of at least two mould parts (8–10), and by providing a second component (9) on the first injection moulding piece (25) in the second mould (7); and whereby every injection moulding piece (25) formed in the first mould (3) is transferred to the second mould (7) by a transfer part (1 5) provided between the mould parts (4–6–8–10) of the abovementioned moulds (3–7), characterized in that the injection moulding pieces (25) formed in the first mould (3) are secured to the transfer part (15) during the transfer to the second mould (7) for at least part of this movement by a securing mechanism (40) which can be activated.

20 Claims, 11 Drawing Sheets

METHOD FOR MANUFACTURING BRUSH BODIES FOR TOOTH BRUSHES

BACKGROUND OF THE INVENTION

1. Field of the Invention

The present invention concerns a method and device for manufacturing brush bodies for tooth brushes.

2. Description of the Related Art

In particular, it concerns a method for injection moulding brush bodies consisting of at least two components, of the type whereby at least one first injection moulding piece is formed of a first component in a first mould, consisting of at least two mould parts; whereby at least one second injection moulding piece is formed by providing the first injection moulding piece in a second mould, which also consists of at least two mould parts, and by providing a second component on the first injection moulding piece in said second mould; and whereby every injection moulding piece formed in the first mould is transferred to the second mould by means of a transfer part provided between the mould parts of the above-mentioned moulds.

Methods of the above-mentioned type, as well as devices to realize such methods, are known from EP 0.504.571 and DE.4.127.621.

SUMMARY OF THE INVENTION

The invention aims to further perfect these known methods, such that the injection moulding can be carried out considerably smoother than has been the case until now.

To this aim, the present invention in the first place concerns a method of the above-mentioned type, characterized in that the injection moulding pieces formed in the first mould are secured against the transfer part during the transfer to the second mould for at least part of this movement by means of securing means which can be activated, preferably clamping means. The use of securing means which can be activated offers the advantage that such a clamping of the injection moulding pieces to the transfer part is obtained that malfunctions due to the undesired coming loose of the injection moulding pieces from the transfer part is excluded on the one hand, and that injection moulding pieces only have to be clamped over a very short length on the other hand.

According to a particular characteristic of the invention, no pins for the formation of holes to insert the brush hair in are provided in the transfer part, and such pins are exclusively provided in the first mould. Consequently, a single series of pins will be sufficient, as a result of which the device will be considerably cheaper and easier to maintain. For, being precision parts, such pins are costly. Moreover, they are very vulnerable.

According to another particular characteristic of the invention, whereby use is preferably made of moulds which are composed of a fixed and a moveable mould part, the injection moulding pieces formed in the first mould are ejected on either side by moving the moveable mould part in relation to the fixed mould part on the one hand, and by moving the transfer part in relation to the fixed mould part on the other hand, both in the same direction.

As the above-mentioned movements are carried out in the same direction, this offers the advantage that the ejection can be carried out smoother and faster than in the case where, as described in EP 0.504.571 and DE 4.127.621, the moveable mould parts first have to be moved in one direction together with the transfer part, after which the transfer part is moved back in the opposite sense into an intermediate position.

The present invention also concerns a device applying the above-mentioned method.

BRIEF DESCRIPTION OF THE DRAWINGS

In order to better explain the characteristics of the invention, the following preferred embodiments are described as an example only without being limitative in any way, with reference to the accompanying drawings, in which.

DETAILED DESCRIPTION OF THE PREFERRED EMBODIMENTS

As represented in the figures, the invention is related to a device 1 for injection moulding brush bodies 2 for tooth brushes.

The device 1 mainly consists of the combination of a first mould 3 which in this case is formed of a fixed mould part 4 through which the first component 5 is injected and a moveable mould part 6; a second mould 7 which in this case is formed of a fixed mould part 8 through which the second component 9 is injected and a moveable mould part 10; a first injection device 11 which is connected to a supply duct 12 in the fixed mould part 4; a second injection device 13 which is connected to a supply duct 14 in the fixed mould part 8; a transfer part provided between the fixed mould parts 4–8 and the moveable mould parts 6–10, which in this case is rotatable and has two insertion pieces 16–17 which fit in recesses 18–19 in the fixed mould parts 4–8; driving means 20 to open the moulds 3–7, in this case to move the moveable mould parts 6–10 in relation to the fixed mould parts 4–8; and driving means 21 to move the transfer part 15 laterally on the one hand and to move the transfer part 15 between the moulds 3 and 7 on the other hand, in this case by rotating it around a shaft 22.

The two moulds 3 and 7 preferably form a whole. The mould parts 4 and 8 are formed of a single plate, whereas the mould parts 6 and 10 are formed a second plate.

The moulds 3 and 7 are preferably each provided with several mould impressions 23–24 which make it possible to simultaneously form several injection moulding pieces 25 in the first mould 3 as well as several injection moulding pieces 26 in the second mould 7. To this aim, the mould parts 4–6–8–10 have several cavities 27–28–29–30 provided parallel to one another.

In the example shown, the transfer part 15 mainly consists of a rotatable frame 31 onto which the insertion parts 16–17 are fixed. These insertion parts 16–17 consist for example of laths which are provided with recesses 32 which are part of the mould impressions 23–24 when the whole is in closed position.

The frame 31 is fixed to a shaft 33 which is coupled to the driving means 21. The driving means 20 to move the mould parts 6–10 can be of any nature whatsoever. Preferably, use will be made of a drive system with a hydraulic cylinder which is connected to the mould parts 6–10 either directly of by means of a buckling arm.

In this case, the driving means 21 are designed such that they can provide both for a lateral movement of the transfer part 15 as for a rotation thereof. As represented, they are preferably situated on the side of the moveable mould parts 6–10.

In the example of FIGS. 1 to 10, the device 1 according to the invention is also provided with a series of pins 34 which reach into the mould impression 23 when the whole is in closed position and which are designed to form holes 35 at a later stage to insert brush hair in the brush bodies 2. These pins 34 are preferably only present in the moveable mould part 6 of the first mould 3.

These pins 34 can be moved between a position in which they protrude in the mould impression 23 and a position in which they are withdrawn in the mould part 6. In the example shown, this movement is obtained by means of driving means 36 which are fixed to the mould part 6. However, it is clear that this movement can also be realised in other ways, for example by means of a stop system which is carried out such that the movement of the moveable mould parts 6–10 at the right moment also results in a movement of the pins 34 in relation to the mould part 6.

The mould 3 is provided with means which make sure that, when this mould 3 is opened, every injection moulding piece 25 formed herein adheres to the fixed mould part 4, in particular remains in the cavities 27. These means are preferably formed of what is called a counter draft, for example at the height of the part of the mould impression 23 where the handle of the brush body 2 is formed. Such a counter draft implies that the cavities 27 are formed such that the injection moulding pieces 25 formed herein are so to say slightly encapsulated, so that they can only be removed from the cavities 27 with a certain effort. Preferably, such a counter draft will only be carried out locally, for example on the spot indicated with arrow A in FIG. 1. This spot can possibly be selected such that traces remaining on the injection moulding pieces 25 due to the presence of the counter draft are hidden from view as they are sprayed over later on by the second component 9.

As represented in the figures, the second mould 7 is preferably provided with ejection means 37 to extract the injection moulding pieces 26, which normally form the ready- for-use brush body 2, from the mould 7. These ejection means 37 are preferably provided on the moveable mould part 10 and may consist, as is schematically represented, of moveable press-out elements 38 which are controlled by means of appropriate driving means 39.

It should be noted that the second mould 7 is made such that, when the moveable mould part 10 is removed in relation to the fixed mould part 8, with the transfer part 15 remaining in the fixed mould part 8, the injection moulding piece 26 formed in the second mould 7 will adhere to the moveable mould part 10 and thus will come loose from the fixed mould part 8. This can be realized thanks to an appropriate design of the cavities 29 and 30.

Figure 1:
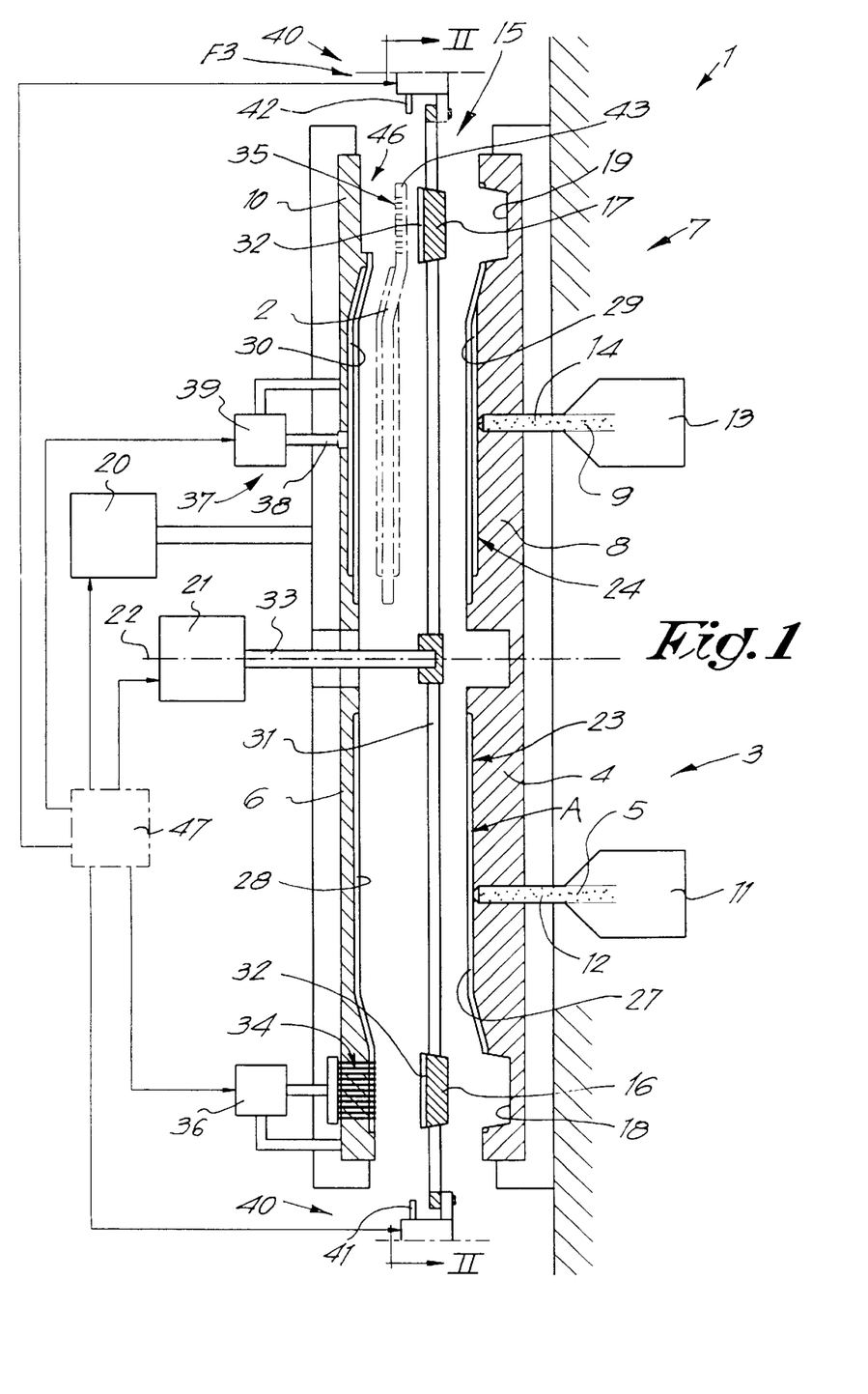
FIG. 1 schematically represents a section of a device according to the invention in open position.
Figures 2, 3:
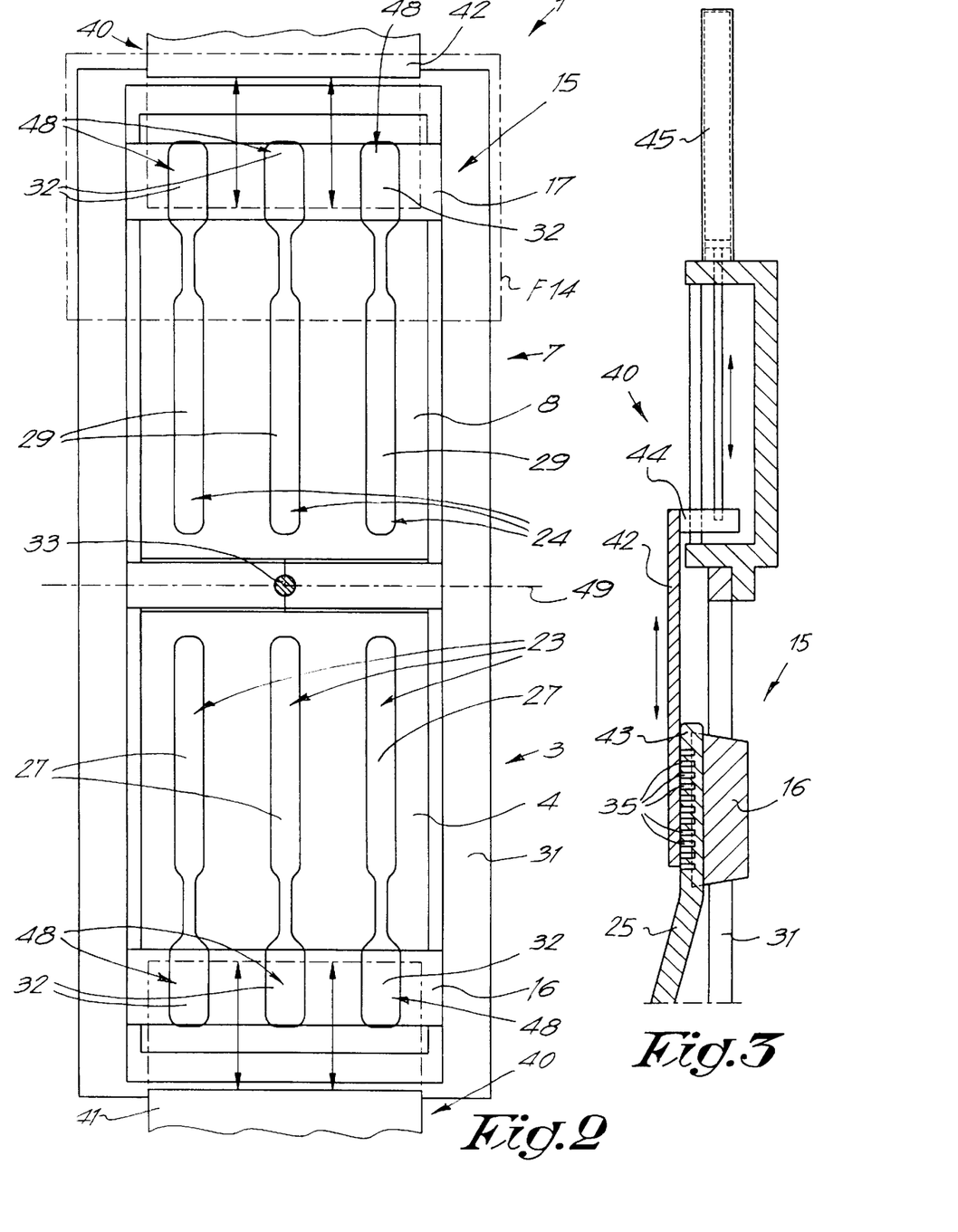
FIG. 2 represents a section according to line II—II in FIG. 1.
FIG. 3 shows a section of a possible embodiment of the part which is indicated with arrow F3 in FIG. 1.

The device 1 is provided with securing means 40 according to the invention which, when activated, prevent the injection moulding pieces 25 concerned from coming loose from the transfer part 15. As represented in the FIGS. 2 and 3, these securing means 40 are fixed to the transfer part 15 and consist of moveable supports 41–42 which can move in front of the heads 43 of the injection moulding pieces 25. The movement of the supports 41–42 is obtained for example by means of carriages 44 and pressure cylinders 45, as represented in FIG. 3, or in any other way whatsoever.

In the second mould 7 is provided a recess 46 which makes it possible for the mould 7 to be closed, even when a support 41 or 42 is provided between the mould parts 8–10.

According to the invention, the device 1 is preferably also provided with control means 47 and/or driving means 20 and 21 which are made such that, as will become clear further from the description of the different positions, the injection moulding pieces 25 formed in the first mould 3 will be ejected on either side thanks to a movement in the same direction of the mould part 6 in relation to the mould part 4 on the one hand, and of the transfer part 15 in relation to the fixed mould part 4 on the other hand.

It is clear that the driving means 36 and 39, as well as the securing means 40 can also be controlled by means of the control means 47.

According to another characteristic of the invention, as represented in the figures, use is made of insertion pieces 16–17 which combine two characteristics, namely that they cooperate with recesses 18–19 in the fixed mould parts 4–8 on the one hand, and that they cooperate with the parts 48 of the mould impressions 23–24 in which the heads 43 of the brush bodies 2 are formed on the other hand.

According to another characteristic of the invention, use is made of insertion pieces 16–17 which also combine the characteristics that they cooperate with the above-mentioned parts 48 on the one hand, and that they are situated near the outer edges of the moulds 3–7 on the other hand. This implies that the mould impressions 23–24 with the parts 48 in which the heads 43 of the brush bodies 2 are formed are directed outwards, in other words in the example of FIGS. 1 to 10 are directed away from the axial line 49 which is defined by the parting line between the moulds 3 and 7.

The working of the device 1, as well as the steps of the method used hereby, can be easily derived from the FIGS. 4 to 10.

Figure 4:
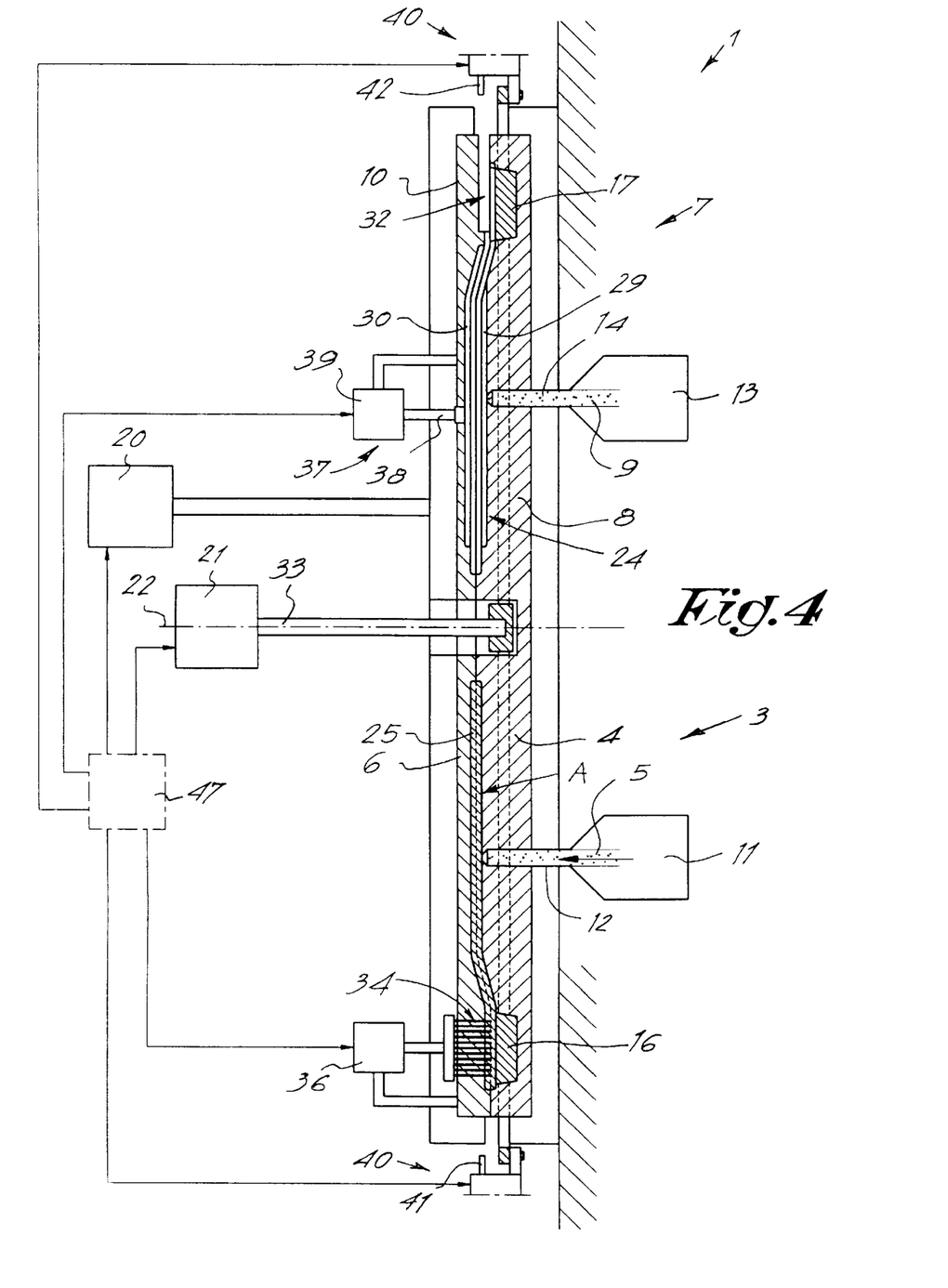
FIGS. 4 to 10 show the device of FIG. 1 in different positions.

At first, the moulds 3–7 are closed and the pins 34 are presented in the mould impression 23, after which the synthetic component 5 is injected, as a result of which, as represented in FIG. 4, one or several first injection moulding pieces 25 are created.

Subsequently, the driving means 36 are activated and thus the pins 34 are retrieved from the mould impression 23 and consequently also from the head 43 of the injection moulding pieces 25.

Figure 5:
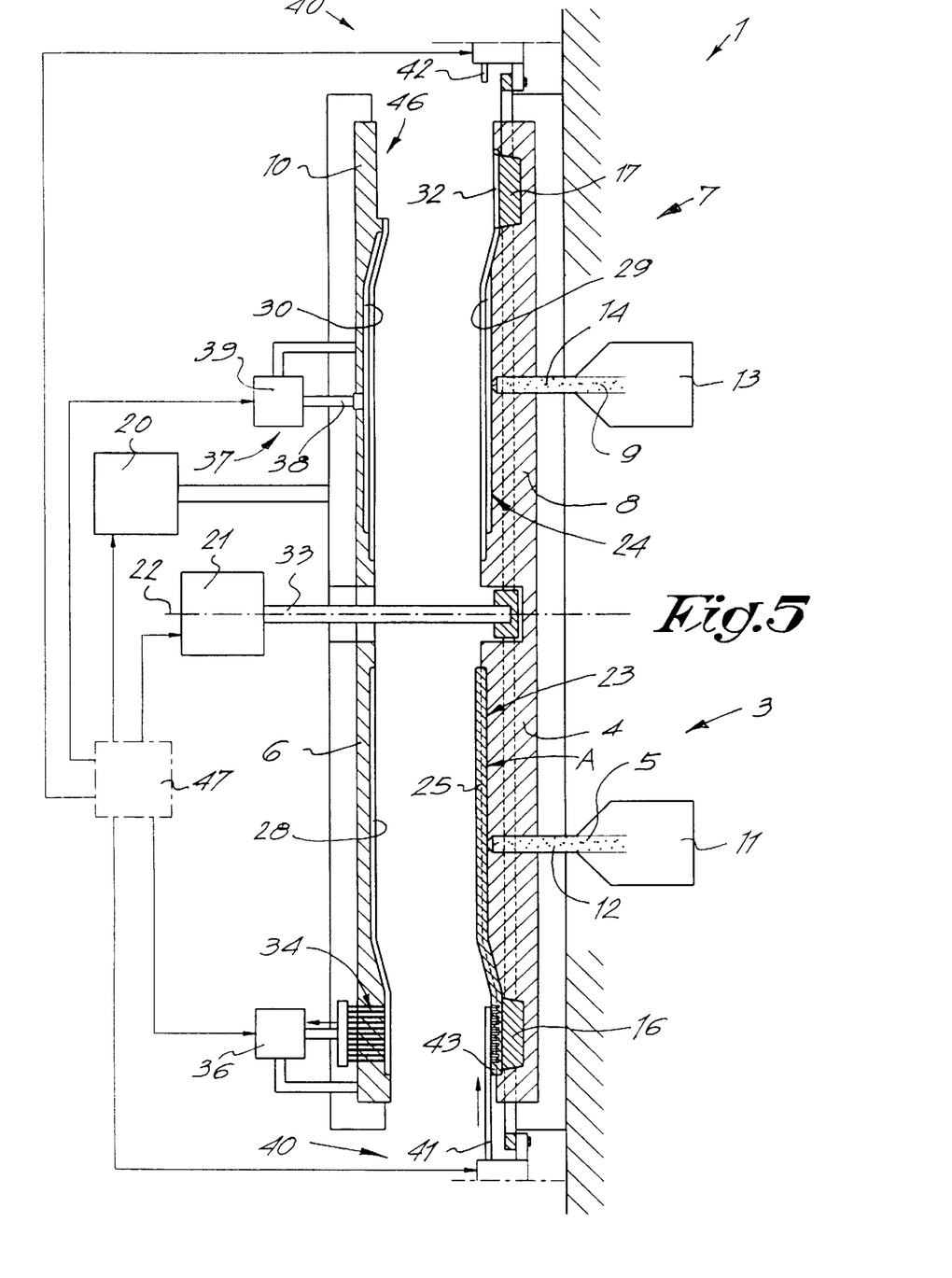

Then, the mould parts 6 and 10 are moved by activating the driving means 20, so that the situation as represented in FIG. 5 is created. The injection moulding pieces 25 hereby remain in the cavities 27, due to for example the above-mentioned counter draft.

Next, the support 41 is moved, so that it is placed behind the heads 43 of the injection moulding pieces 25.

Figure 6:
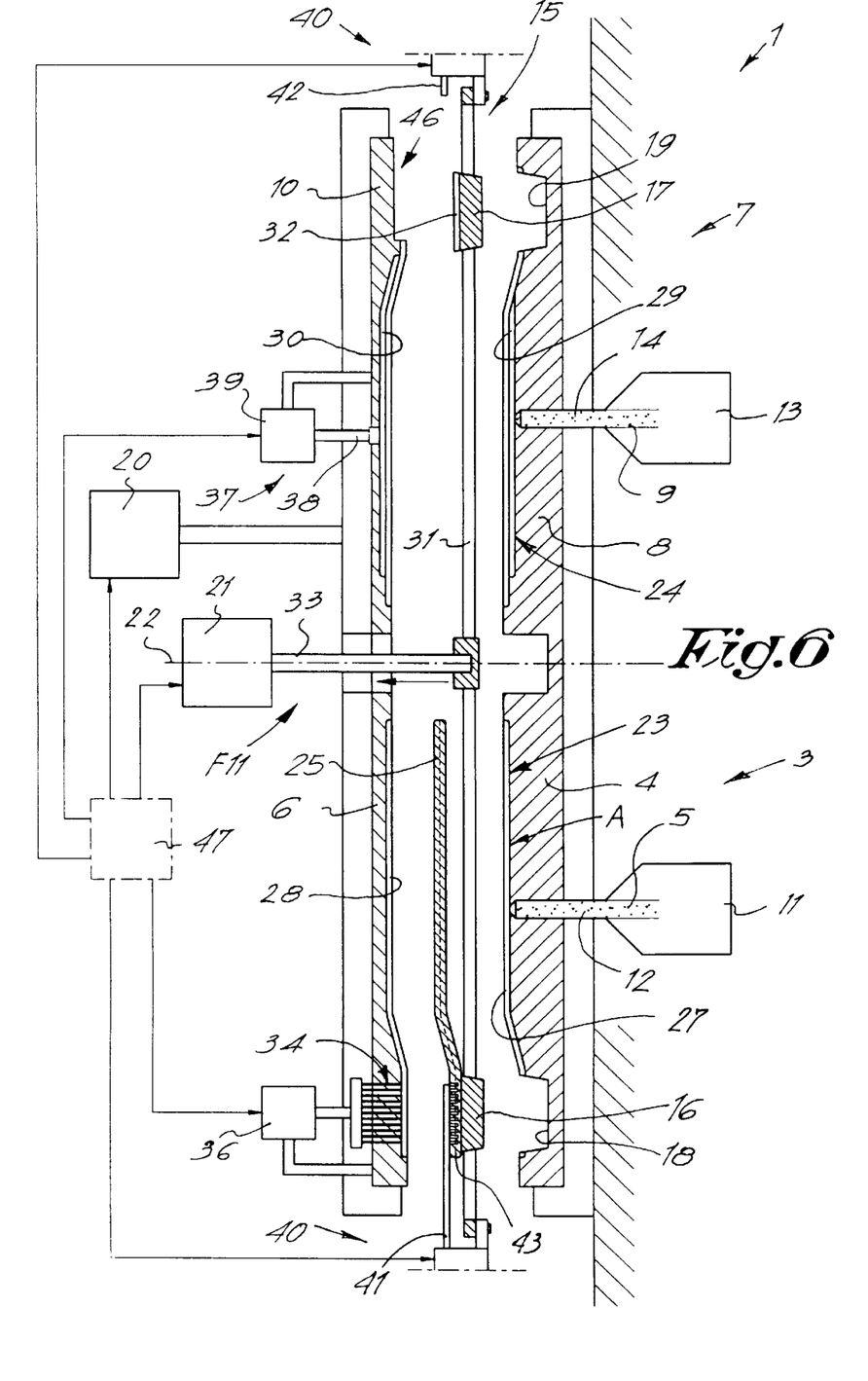

By subsequently moving the transfer part 15 in relation to the fixed mould parts 4–8, a situation as represented in FIG. 6 is created, whereby every first injection moulding piece 25 is ejected and is only retained by means of the transfer part 15 and the support 41. Due to the fact that the injection moulding pieces 25 are supported on two sides, namely by the insertion piece 16 concerned on the one hand and by the support 41 on the other hand, the first injection moulding pieces 25 can be pulled loose from the cavities 27 without any problems, without coming loose from the transfer part 15.

Figure 7:
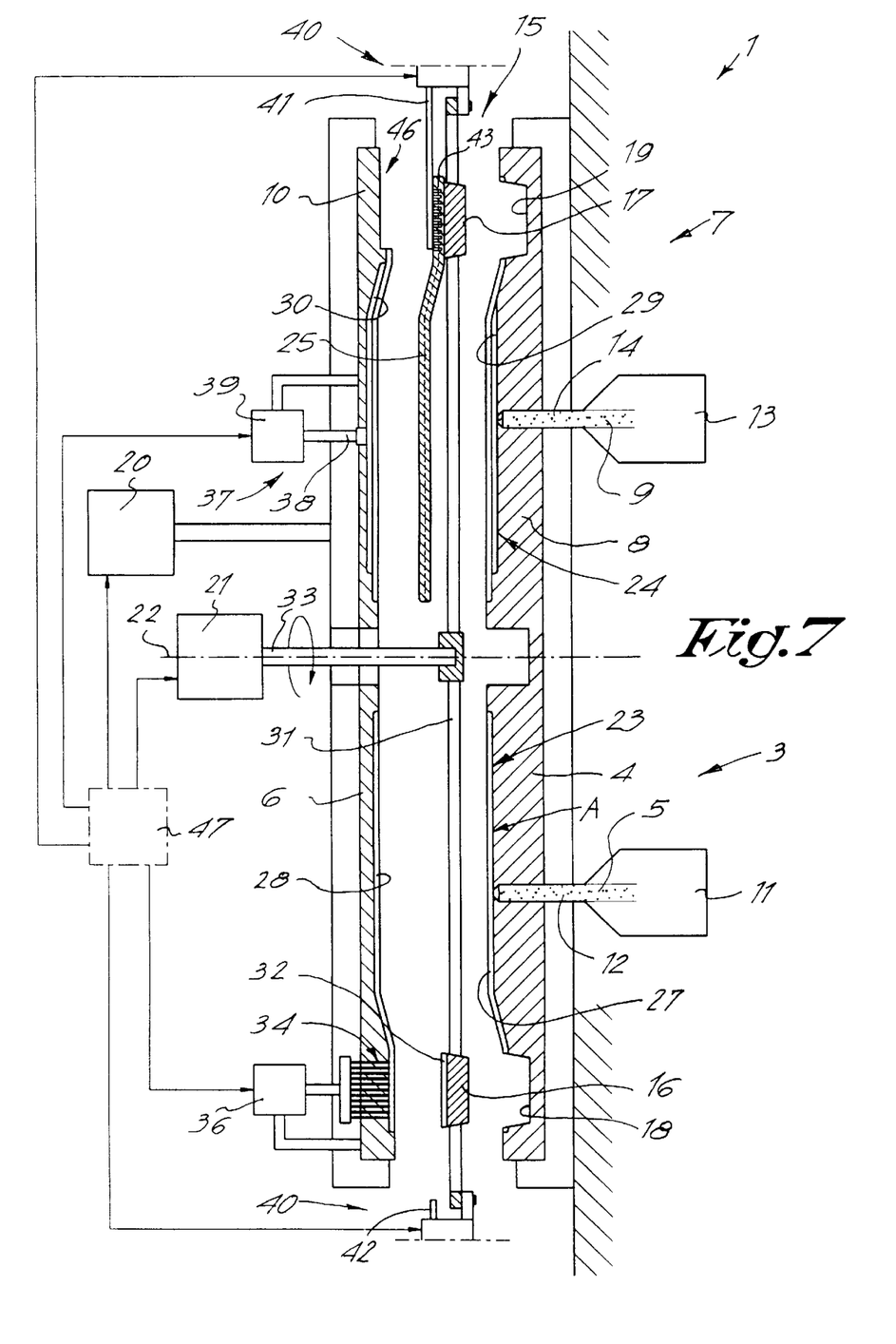

Because the transfer part 15 is rotated 180°, the injection moulding pieces 25 end up between the mould parts 8 and 10, as represented in FIG. 7.

Due to the fact that the injection moulding pieces 25 are retained between the insertion piece 16–17 concerned and the supports 41–42, there is a very effective clamping which makes it possible for the injection moulding pieces 25 to be held exclusively by their heads 43 during the rotation of the transfer part 15, which offers the advantage that the second component 9 can be provided right next to the head 43.

Figure 8:
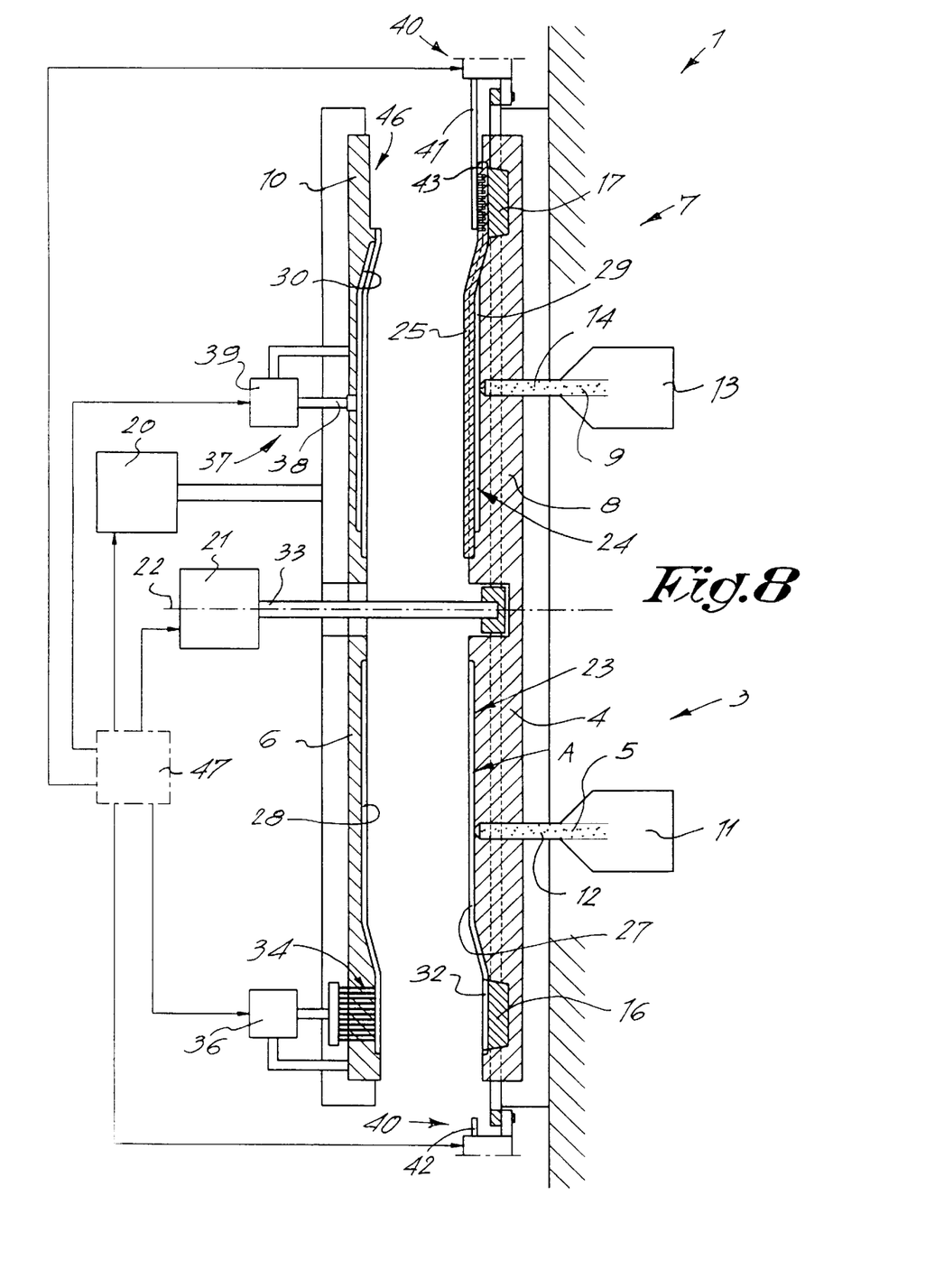
Figure 9:
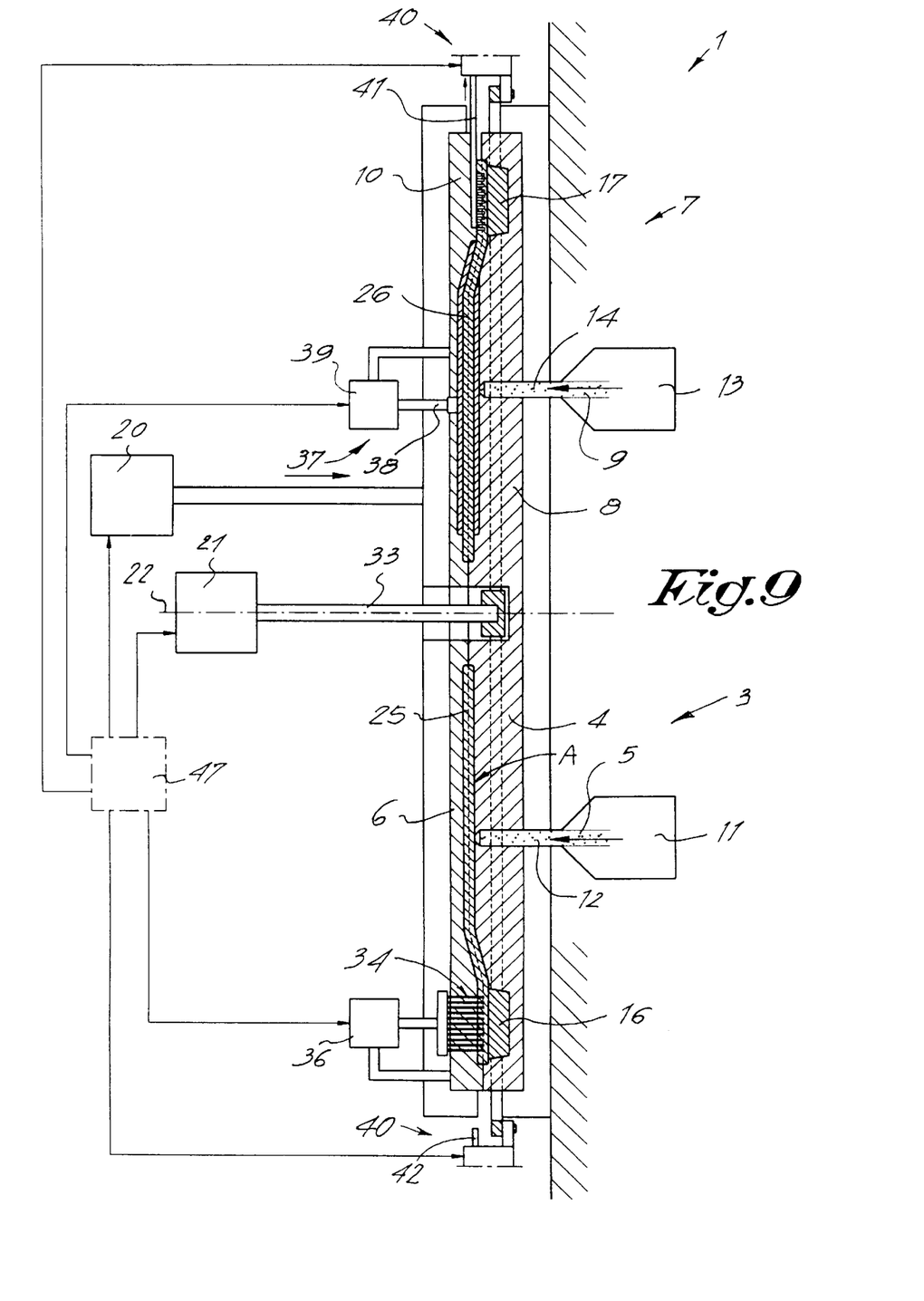

By subsequently shifting back the transfer part 15, as represented in FIG. 8, and by then closing the moulds 3–7 again, by putting the pins 34 in the mould impression 23 again and by injecting synthetic material in both moulds 3–7, new injection moulding pieces 25 are formed in the first mould 3 on the one hand and injection moulding pieces 26 are formed in the second mould 7 on the other hand, as represented in FIG. 9. The injection moulding pieces 26 hereby consist of injection moulding pieces 25 to which a part has been added by means of the synthetic component 9 supplied via the injection device 13.

These injection moulding pieces 26 preferably form the brush bodies 2 to be finally formed.

Figure 10:
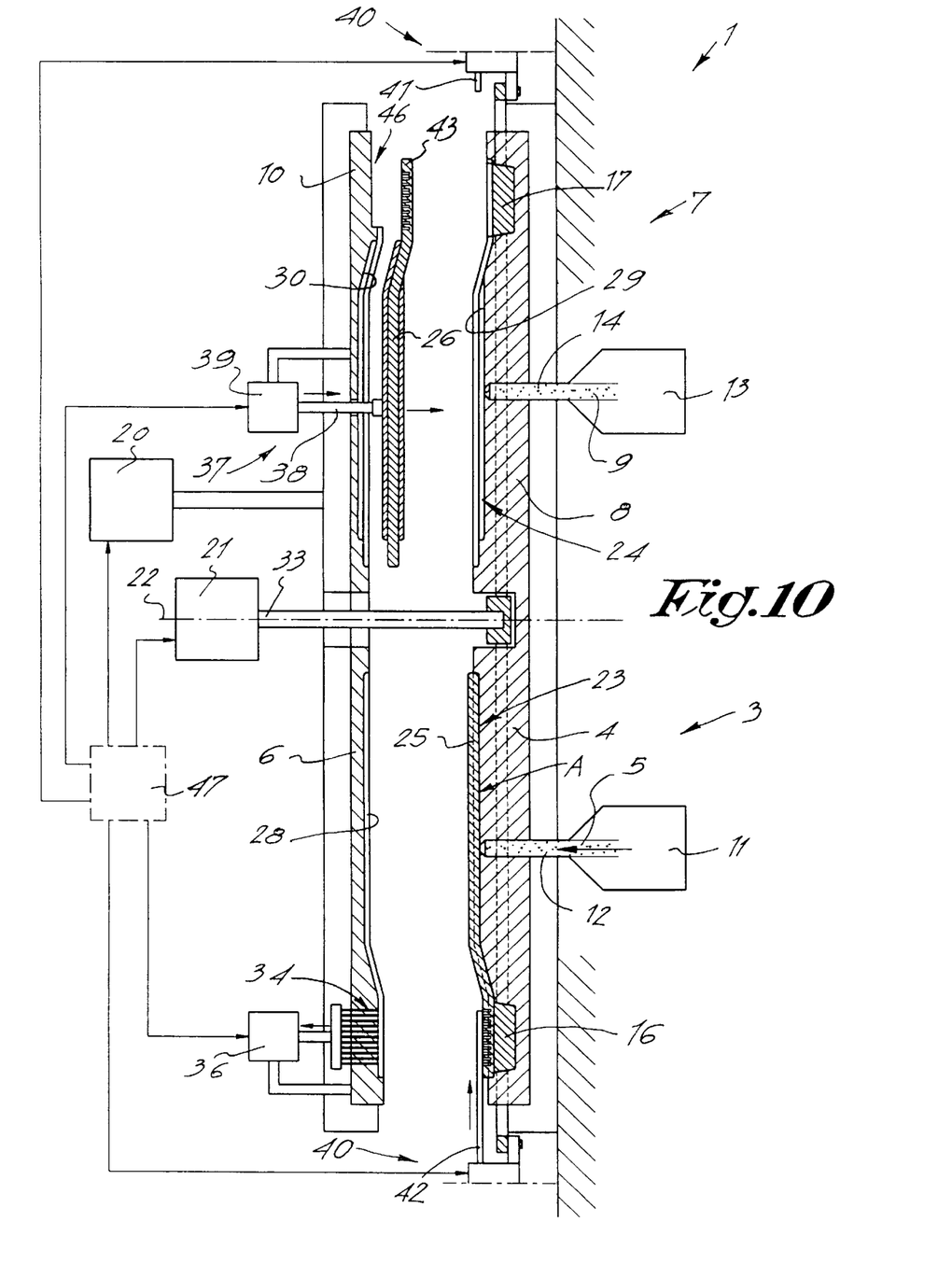

After the moulds 3–7 have been closed, the support 41 is withdrawn again. The injection moulding is followed by an ejection as is represented in FIG. 10, whereby the ejection means 37 are active.

According to an alternative which is not represented here, the finished brush bodies 2 can be held in the fixed mould part 8 during the opening of the mould 7 by not immediately withdrawing the support 41 concerned. By only withdrawing the support 41 when the transfer part 15 of both mould parts 8–10 is released, the brush bodies will automatically fall out of the mould. The support 41 can also be withdrawn after the moveable mould part 10 has been moved, but before the transfer part 15 is moved. It should be noted hereby that the brush bodies 2 easily come loose due to the shock at the start and stop of the moveable parts, so that the ejection is no problem whatsoever. A major advantage is that the ejection means 37 are no longer required.

Preferably, the transfer part 15 will be further rotated stepwise in the same sense of rotation after each cycle, for example at the above-mentioned angle of 180°. However, a to-and-fro rotation is not excluded.

It should be noted that the ejection as a result of a movement in the same sense of, on the one hand, the moveable mould parts 6–10 in relation to the fixed mould parts 4–8 and, on the other hand, of the transfer part 15 in relation to the fixed mould parts 4–8 can also be realized in other manners than the manner as represented in FIGS. 4 to 10. For example, the moveable mould parts 6–10 and the transfer part 15 can be moved simultaneously, whereby the transfer part 15 is moved ore slowly than the mould parts 6–10. It is also possible to move the transfer part 15 and the moveable mould parts 6–10 together over a specific course first, to subsequently stop the transfer part 15 and to further move the mould parts 6 and 10 over a certain distance.

The means which make sure during the opening of the mould 3 that every injection moulding piece 25 formed herein remains in its cavity 27, may consist, according to a variant which is not represented here, of a springy ejector with a restricted course, provided in the moveable mould part 6 and which retains every injection moulding piece 25 against the fixed mould part 4 during a part of the movement of the mould part 6, sufficiently far to make it possible for the securing means 40, and in particular the supports 41 or 42 to be presented to the injection moulding pieces 25 before said ejector comes loose from the ejection moulding pieces concerned.

Although the ejection preferably takes place by means of a movement in the same direction of the mould parts 6–10 in relation to the mould parts 4–8, and of the transfer part 15 in relation to the mould parts 4–8, it is not excluded to select another sequence for the movement of the various parts. According to an alternative, the transfer part 15, and consequently also the injection moulding pieces 25, can be moved along during the opening of the mould 3, whereas the pins 34 are not withdrawn yet. Subsequently, the transfer part 15 can be moved back in the direction of the fixed mould part 4, together with the pins 34 which are further extended, whereby the injection moulding pieces 25 move along, as they are clamped between the latter two. Next, the securing means 40 can be activated. In this case, these securing means are made such, however, that the injection moulding pieces 25 are clamped or secured on those places where there are no pins 34. By then withdrawing the pins 34 into for example the position in which they are normally situated during the injection moulding, the injection moulding pieces 25 are suspended freely on the transfer part 15, after which the method can be continued stepwise as described above.

Figures 11, 12, 13:
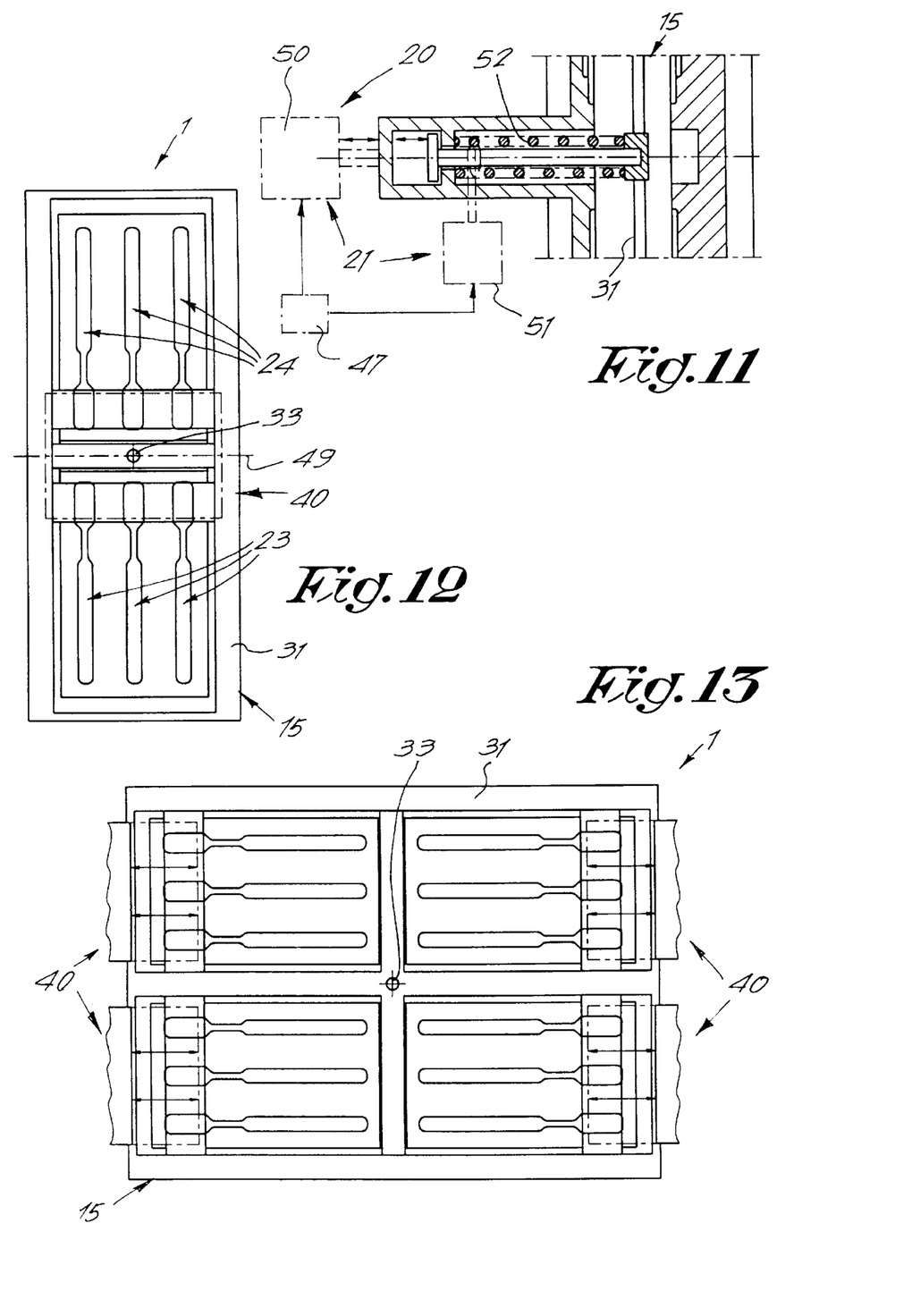
FIG. 11 schematically represents a variant of the part which is indicated with arrow F11 in FIG. 6.
FIGS. 12 and 13 schematically represent two variants of FIG. 2.

FIG. 11 schematically represents a variant whereby use is made for the lateral drive of a common driving element 50. The movement of the transfer part 15 between the moulds 3–7, in this case the rotation thereof, is carried out by means of a separate driving element 51. The transfer part 15 is hereby supported on the mould parts 6–10 by means of a spring 52.

FIG. 12 schematically shows how the mould impressions 23–24 can also be directed with the parts 48 towards the inside, in other words with the parts forming the handles directed away from the axial line 49.

FIG. 13 schematically shows a multiple embodiment, whereby every mould 3–7 is provided with six mould impressions, 23–24 respectively.

Figure 14:
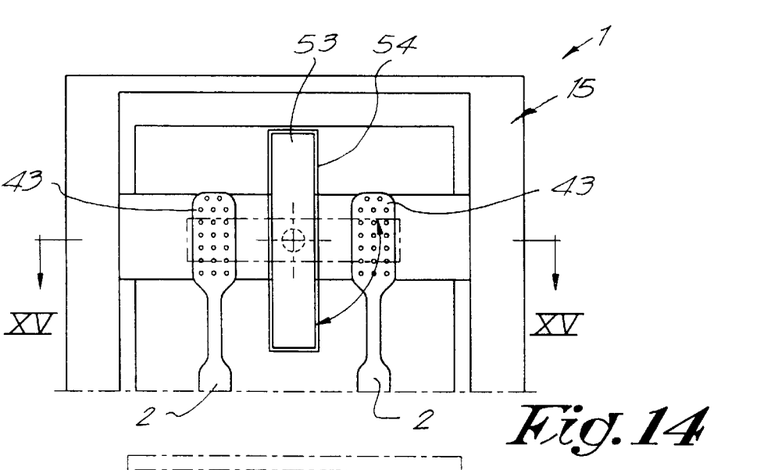
FIG. 14 schematically represents a variant of the part which is indicated with F14 in FIG. 2.
Figure 15:
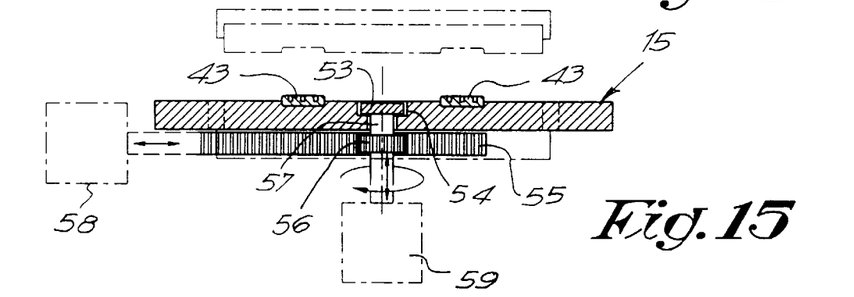
FIGS. 15 and 16 represent schematic sections according to line XV—XV in FIG. 14 for two positions.
Figure 16:
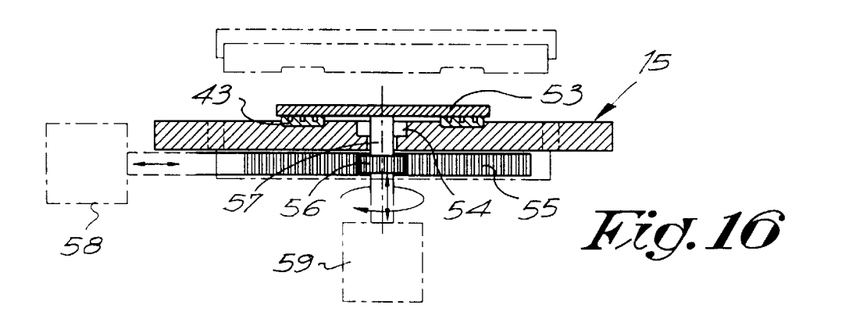

FIGS. 14 to 16 schematically show a variant of the securing means 40. To this end, a rotatable and slidable clamping element 53 which is countersunk in a recess 54 in rest position is provided at every end of the transfer part 15, as is represented in the FIGS. 14 and 15, and it is placed in front of the heads 43 in the clamping position and is possibly also tightened against them.

In the example shown, the rotation of the clamping element 53 is obtained thanks to the shifting of a tooth lath 55 which can rotate the shaft 57 upon which the clamping element 53 is fixed via a gear wheel 56 coupled to it. The shifting of the tooth lath 55 is carried out by means of a driving element 58, whereas the shifting of the clamping element 53 is carried out by means of a driving element 59.

It should be noted that the driving elements 58 and 59 do not necessarily have to be mounted on the transfer part 15. It is clear that they can be erected on the perimeter of the transfer part 15 or behind the fixed mould part 4, whereby couplings are provided which automatically provide for a connection with for example a tooth lath 55 and the shaft 57 in the positions in which the transfer part 15 is standing still.

Figure 17:
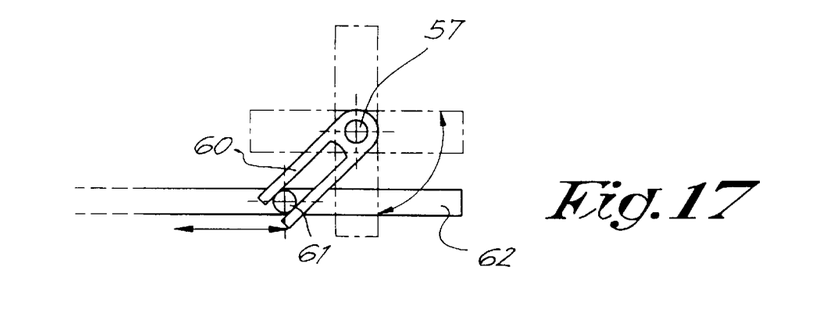
FIG. 17 shows another variant of the part which is indicated in FIGS. 15 and 16.

Finally, FIG. 17 shows another variant of a mechanism to rotate the shaft 57 to and fro which makes use of a fork 60 mounted fixed on the shaft 57 which cooperates with a pin 61 provided on a moveable element 62.

It should be noted that the main idea of the invention can also be used for embodiments in which both mould parts can be moved.

Naturally, the main idea of the invention can also be used for devices having a rotatable transfer part which cooperates with or is part of the moveable mould parts.

It is clear that the device 1 according to the invention can also be carried out with several successive moulds, for the injection moulding of more than two components, whereby the transfer of the injection moulding pieces can also be carried out by means of a similar transfer part 15. The rotation is then carried out over less than 180°, for example 120° in the case of three moulds.

It is also clear that it is possible with a device according to the invention to hold the injection moulding pieces 25 very locally. Although they are preferably held at the head 43, they can also be held in other parts, for example at the neck, in other words the transition between the head 43 and the handle, so that an extra synthetic component can be provided on the head 43 in the second mould 7.

In the case where a second component is added to the heads 43, the device 1 will be preferably provided with a second series of pins which cooperate for example with the second mould 7 and which take place in the holes 35 which are already formed. As a result, the holes 35 stay open, on the one hand because no synthetic material can penetrate in the holes 35 due to the fact that the holes 35 are filled, and on the other hand because these pins offer a support for the heads 43 concerned, so that these heads 43 will not deform due to the injection pressure prevailing in the second mould 7, as a result of which the second component cannot find its way around the head 43 already formed. This second series of pins can be provided on a fixed spot in the mould 7, which implies that they cannot shift in relation to the mould part to which they are fixed, but according to a variant they can also be erected in a withdrawable manner. These pins can also be erected in a floating manner, so that they can easily penetrate in the already formed holes 35 at any time, even when the injection moulding pieces 25 are slightly deformed due to shrinkage at the time they are provided in the second mould 7. The diameter of these pins must not be identical to that of the pins 34 either. This second series of pins may cover the entire hole pattern, but according to a variant it may also cover only part of it, whereby this part coincides for example with the part of the head 43 which is provided with a second component. Nor must the pins of this second series extend over the entire depth of the holes. In fact, these pins may also be formed of small sealing elements, for example with a conical point, which are pressed against the entries of the holes 35.

It should be noted that the invention also concerns devices 1 whereby, instead of the pins 34, the brush hairs are presented in the mould, for example the mould 3, by means of suitable means, such that the brush hairs are cast in directly.

Although, as described above, the injection moulding pieces 25–26 are directed with their heads 43 outwards in relation to the point of rotation of the transfer part 15, it is not excluded to place the injection moulding pieces 25–26 the other way round, i.e. with their handles towards the outside. This offers the advantage that the parts of the transfer part 15 and of the securing means 40 are situated closer to the centre of rotation, which restricts the inertia effect.

Instead of a transfer part 15 which can only rotate in order to move between the moulds 3 and 7, a transfer part could be used which makes another movement to this end, for example a movement consisting of one or several translations or a combined translation and rotation movement. In the case of a translation, the moulds 3 and 7 will be situated next to one another.

The present invention is by no means restricted to the embodiments described above and represented in the accompanying drawings; on the contrary, such a method and device according to the invention can be made in all sorts of variants while still remaining within the scope of the invention.

I claim:

1. A method for manufacturing a brush body for a tooth brush by injection moulding, the brush body comprising at least two components, the method comprising the steps of:

forming at least one first injection moulding piece of a first component by injecting the first component into a first mould comprising at least two mould parts;

transferring the first injection moulding piece to a second mould, also comprising at least two mould parts, by a transfer part which is provided between the mould parts and forms a portion of a cavity of the first mould;

securing the first injection moulding piece to the transfer part during at least part of the transferring to the second mould by an activatable securing mechanism; and forming at least one second injection moulding piece by providing the first injection moulding piece in the second mould and injecting a second component into the second mould on the first injection moulding piece.

2. The method according to claim 1, wherein each of the two mould parts comprises a fixed mould part and a movable mould part, the transfer part cooperating with the fixed mould parts, further comprising the step of:

ejecting the first and second injection moulding pieces from the first and second moulds, respectively, by moving the movable mould parts in a first direction relative to the fixed mould parts and moving the transfer part in the first direction relative to the fixed mould parts.

3. The method according to claim 2, wherein the ejecting step further comprises:

first moving the movable mould parts and subsequently moving the transfer part.

4. The method according to claim 1, wherein the securing step further comprises:

securing the first injection moulding piece to the transfer part by exclusively holding a head of the brush body.

5. The method according to claim 1, wherein the transferring step further comprises:

translating the transfer part from the first mould to the second mould.

6. The method according to claim 1, wherein the transferring step further comprises:

rotating the transfer part from the first mould to the second mould.

7. The method according to claim 6, wherein the rotating is stepwise in a single direction of rotation.

8. The method according to claim 1, further comprising the step of:

providing the transfer part with insertion pieces situated at the height of a part of each mould impression, respectively, in which a head of the each injection moulding piece is to be formed.

9. The method according to claim 8, further comprising the step of:

inserting the insertion pieces respectively in each of the fixed mould parts before forming the first and second injection moulding pieces respectively.

10. The method according to claim 2, wherein the ejecting step is accomplished by moving the movable mould parts and the transfer part with a common driving element and the transferring step is accomplished by moving the transfer part between the first and second moulds.

11. The method according to claim 1, further comprising the step of:

activating the securing mechanism via at least one driving element erected separately from the transfer part and coupled to the transfer part when the transfer part is in a rest position.

12. The method according to claim 1, further comprising the step of:

forming holes in the first injection moulding piece for brush hairs by pins exclusively arranged on the first mould to cooperate with one of the mould parts.

13. The method according to claim 1, further comprising the step of:

inserting brush hairs directly into a mould impression of the first mould by a mechanism exclusively arranged on the first mould to cooperate with one of the mould parts.

14. The method according to claim 1, further comprising the step of:

forming holes in the first injection moulding pieces by a first series of pins; and providing a second series of pins in the holes during the forming of the second injection moulding piece so that the holes stay open and are supported against deformation.

15. The method according to claim 1, wherein the step of securing the first injection moulding piece to the transfer part by an activatable securing mechanism is executed before the first injection moulding piece is pushed out of a cavity of the first mould.

16. A method for manufacturing a brush body for a tooth brush by injection moulding, the brush body comprising at least two components, the method comprising the steps of:

forming at least one first injection moulding piece of a first component by injecting the first component into a first mould comprising at least two mould parts;

securing the first injection moulding piece to a transfer part, which is provided between the mould parts and forms a portion of a cavity of the first mould, by an activatable securing mechanism before the first injection moulding piece is pushed out of the cavity of the first mould;

transferring the first injection moulding piece to a second mould, also comprising at least two mould parts, by the transfer part while keeping the first injection moulding piece secured to the transfer part by the activatable securing mechanism during at least part of the transferring to the second mould; and forming at least one second injection moulding piece by providing the first injection moulding piece in the second mould and injecting a second component into the second mould on the first injection moulding piece.

17. A method for manufacturing a brush body for a tooth brush by injection moulding, the brush body comprising at least two components, the method comprising the steps of:

forming at least one first injection moulding piece of a first component;

forming holes in the first injection moulding piece which are adapted to have bristles fixed therein; and forming at least one second injection moulding piece by providing the first injection moulding piece in a mould and injecting a second component into the mould on the first injection moulding piece;

wherein, during the forming of the second injection moulding piece, a series of pins is brought at least partially into at least a number of the holes so that the holes remain open and are supported against deformation.

18. The method according to claim 17, wherein the holes in the first injection moulding piece are formed by a first series of pins and wherein the holes formed by the first series of pins are supported against deformation by a second series of pins which is brought at least partially into at least a number of the holes during the forming of the second injection moulding piece.

19. The method according to claim 18, wherein the first series of pins cooperates with a first mould in which the first injection moulding piece is formed and wherein the second series of pins cooperates with a second mould in which the second injection moulding piece is formed.

20. The method according to claim 19, wherein the first injection moulding piece is transferred from the first mould to the second mould by a transfer element.

* * * * *